(12) United States Patent
Wade

(10) Patent No.: US 9,659,178 B1
(45) Date of Patent: May 23, 2017

(54) DEVICE BLANKING

(71) Applicant: Square, Inc., San Francisco, CA (US)

(72) Inventor: Jeremy Wade, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 589 days.

(21) Appl. No.: 14/183,118

(22) Filed: Feb. 18, 2014

Related U.S. Application Data

(60) Provisional application No. 61/894,350, filed on Oct. 22, 2013.

(51) Int. Cl.
| | | |
|---|---|---|
| *G06F 17/00* | (2006.01) | |
| *G06K 5/00* | (2006.01) | |
| *G06F 21/60* | (2013.01) | |
| *G06Q 20/40* | (2012.01) | |

(52) U.S. Cl.
CPC ......... *G06F 21/60* (2013.01); *G06Q 20/4012* (2013.01)

(58) Field of Classification Search
CPC .......... G06F 21/77; G06F 21/78; G06F 21/60; G06Q 20/4012; G07F 7/0873; G07F 7/0886; G07F 7/0893
USPC ........................................ 235/380, 375, 382
See application file for complete search history.

(56) References Cited

U.S. PATENT DOCUMENTS

| | | | | |
|---|---|---|---|---|
| 5,870,289 A | * | 2/1999 | Tokuda | H01L 21/6835 174/260 |
| 6,056,193 A | * | 5/2000 | McAuliffe | G06F 21/83 235/380 |
| 2004/0095830 A1 | * | 5/2004 | Tanaka | G11C 16/22 365/222 |
| 2006/0155899 A1 | * | 7/2006 | Knapp | G06F 9/30018 710/72 |
| 2013/0086691 A1 | * | 4/2013 | Fielder | G06F 21/78 726/26 |
| 2013/0179351 A1 | * | 7/2013 | Wallner | G06Q 20/34 705/71 |
| 2013/0254431 A1 | * | 9/2013 | Kuroiwa | G06F 3/00 710/14 |

* cited by examiner

*Primary Examiner* — Laura Gudorf
(74) *Attorney, Agent, or Firm* — Maynard Cooper Gale LLP; Joshua V. Van Hoven, Esq.

(57) ABSTRACT

A method and apparatus is disclosed for protecting electronic devices from security breaches (e.g., in the form of DPA attacks) by managing input/output (I/O) pin states. The technique is particularly useful in financial applications in which data security related operations, such as those involving cryptography, are performed by payment card readers, and the power supplied to drive the operations are measured and analyzed by attackers to extract sensitive information. The technique prevents any external device from measuring the operation power by disabling the I/O pins. The I/O pins are set to a logic low at any given time a data security related operation is performed. As a result, no communication with the external environment is possible during the data security operation, and external power measurements by DPAs are prevented.

19 Claims, 5 Drawing Sheets

DEVICE BLANKING

CROSS-REFERENCE TO RELATED APPLICATIONS

This application claims the priority of U.S. Provisional Application No. 61/894,350, filed Oct. 22, 2013. The content of the above-identified application is incorporated herein by reference in its entirety.

BACKGROUND

Electronic devices that process private or sensitive information often employ data security operations, such as cryptography, to ensure that critical operations and communications are secure and that the information is not exposed to unauthorized individuals or devices. Implementation of the data security operations, however, is itself subject to security risks. Such security risks are present, for example, in a type of non-invasive attack known as a side channel attack. A typical side channel attack collects various "side channel information" about an electronic device without directly interfering with, or being easily detected by, the device. Differential power analysis (DPA) attack is a type of side channel attack that analyzes power signals collected from a series of cryptographic executions performed by an electronic device. While this "power signal" side channel information is often subtle and difficult to interpret, the information correlates to certain secret information of the device, and an attacker can implement various statistical algorithms to effectively analyze the information and breach the device's security.

In an illustrative scenario of a DPA attack, power consumption curves of a cryptographic operation executed by a particular device are monitored. The power curves represent incremental changes in power over time over different iterations of a cryptographic operation. In particular, the power used by the device during normal operation is compared to power used during the different cryptographic executions. By monitoring these power variations, an attacker can look for statistical differences between particular subsets of the executions; these differences are correlated with particular key bits to identify the cypher key used and/or other sensitive data involved.

Current defenses against DPA attacks focus on techniques that alter the observable power that can be analyzed. Such techniques include, for example, adding random delays, data masking, and noise generation. Other defenses focus on protection of the power system itself, such that any attempt to physically access the power system is not possible without setting off tamper detection. These defenses, however, merely render the DPA more complex, but not impossible, as more complex statistical algorithms and additional measurement samples may be employed to overcome such techniques. Therefore, there is a need for a more effective approach of protecting devices from DPA attacks.

BRIEF DESCRIPTION OF THE DRAWINGS

One or more embodiments of the present invention are illustrated by way of example and are not limited by the figures of the accompanying drawings, in which like references indicate similar elements.

DETAILED DESCRIPTION

Figure 1:
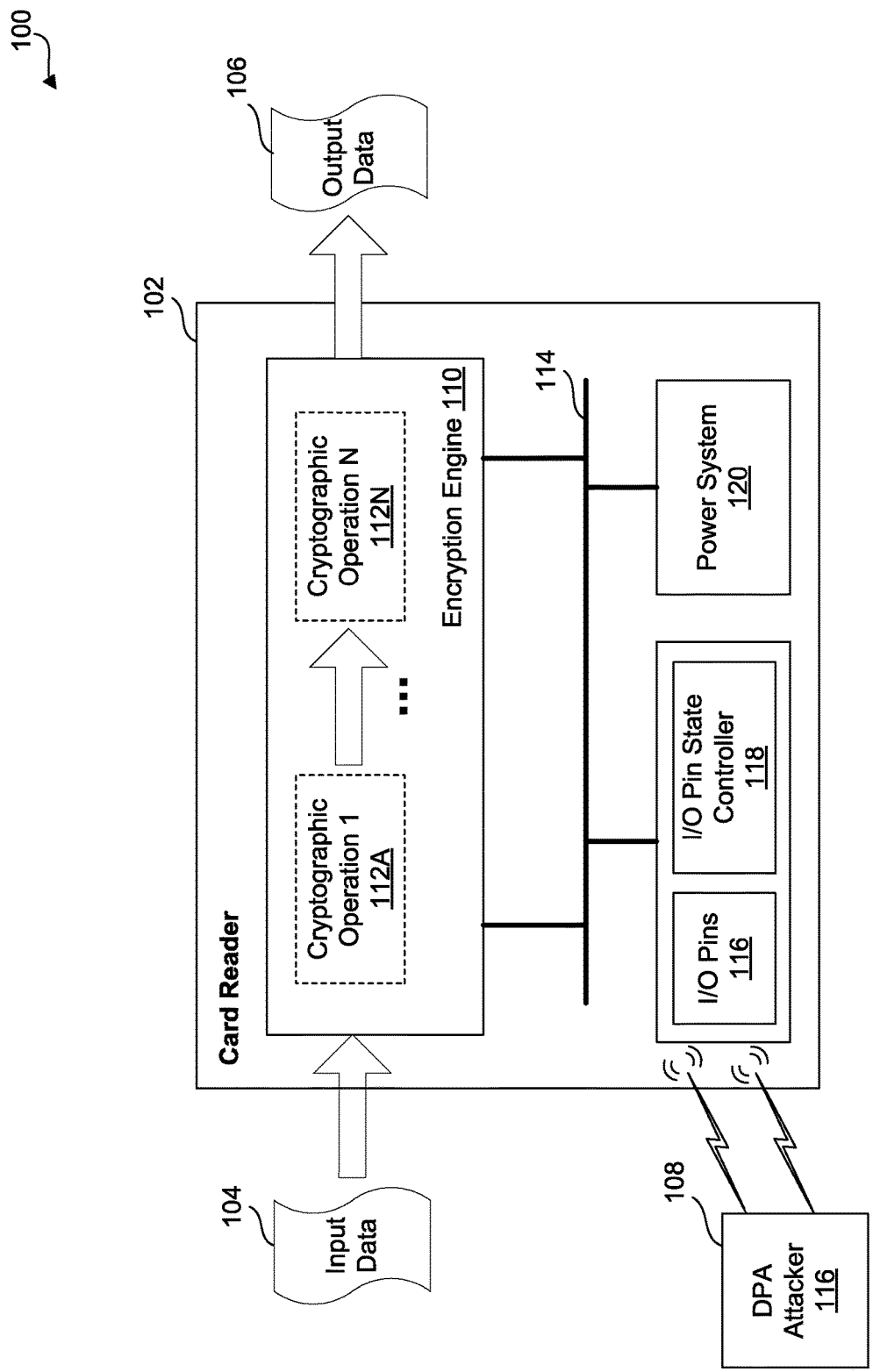
FIG. 1 illustrates an environment in which a card reader is being subjected to a DPA attack.

Introduced herein is a technique that protects electronic devices from security breaches (e.g., in the form of DPA attacks) by preventing measurement of power signals during sensitive operations, such as cryptographic operations. The technique introduced here protects an electronic device while it performs a sensitive operation, so that it does not give off any hints about its internal details (e.g., cipher key) to any device external to the device being protected. The disclosed technique utilizes a blanking method that shuts off the device's communications with the outside world when a sensitive operation is being performed; when such communications are disabled, the device is said to be in "blanking mode." When the sensitive operation is complete, the device reopens its communications.

The disclosed technique executes blanking mode by disabling all input/output (I/O) terminals associated with an electronic device, such that a DPA attacker is not able to utilize the terminals or connectors to gain power information. In particular, in a typical electronic device, an embedded computing system is utilized to execute necessary operations of the device, including internal interactions between internal device components and external interactions with remote devices in the outside world. The embedded computing system employs I/O terminals to allow the device to physically interface, or communicate, with the other devices. In one embodiment, blanking mode is achieved by grounding all of the input terminals to prevent them from functioning. In effect, the input terminals are turned into output terminals, such that the DPA attacker is not able to deliver power via those terminals, and is therefore not able to subsequently measure for differential power signals based on inputs the attacker attempts to apply.

One application in which the disclosed technique may be utilized, for example, is the use of a card reader to facilitate a payment transaction between a consumer and a merchant. The card reader utilizes cryptography for data security in the payment transaction. In the payment transaction, the card reader conducts various operations to interact with the payer and the payee, where only some operations, or interactions, involve cryptography. During the non-cryptographic interactions, the card reader operates normally to communicate with its external environment. Some non-cryptographic interactions include, for example, reading payment data from a payment card or transmitting payment data to a merchant's device. When an interaction does involve cryptography, the card reader enters blanking mode; such interaction includes, for example, encrypting confidential information of a purchaser (i.e., the cardholder). In blanking mode, the card reader recognizes it has entered a point where it needs to perform a data security related operation (e.g., cryptography) and that it must disconnect itself from its external environment in order to achieve greater security for the operation. In such mode, the card reader cannot detect or receive any signal and it cannot convey or transmit any signal to the outside world. Accordingly, blanking mode enables the card to be more resistant to DPA attacks.

References in this specification to "an embodiment," "one embodiment," or the like mean that the particular feature, structure, or characteristic being described is included in at least one embodiment of the present invention. Occurrences of such phrases in this specification do not necessarily all refer to the same embodiment.

FIG. 1 illustrates an example of an environment 100 in which an electronic device 102 is subjected to a DPA attack. As mentioned above, the device 102 may be a card reader that processes payment data received from a payment card. Referring to FIG. 1, the device 102 implements cryptography to process input data 104 and produce output data 106. The input data 104 may be, for example, payment data read by the card reader from a swiping of a payment card (e.g., credit card) through a card slot of the card reader. During the cryptographic operation, a DPA attacker 108 can attempt to extract the data 104 by detecting power leakage through input/output (I/O) pins 116 of the device 102. The DPA attacker 108 may be any computing device capable of monitoring, recording, and analyzing samples of differential power signals dissipated from the device 102.

As illustrated in FIG. 1, the device 102 includes an encryption engine 110, the I/O pins 116, an I/O management controller 118, and a power system 120, all of which are coupled to one another through the interconnect 114. The interconnect 114 can include one or more buses, direct connections and/or other types of physical connections, and may include various bridges, controllers and/or adapters that are well-known in the art. The encryption engine 110, the I/O pins 116, and the I/O management controller 118 may be components on an integrated circuit embedded in the device to execute various operations. The power system 120 may be coupled to the integrated circuit to power the various operations. An example of such integrated circuit is a microcontroller, such as the TI-MSP430G2412 microcontroller, available from Texas Instruments Inc. of Dallas, Tex.

The encryption engine 110 performs one or more cryptographic operations 112A-N to protect the data 104 received and/or stored by the device 102. The power system 120 provides the necessary power for the encryption engine 110 to execute the cryptographic operations 112A-N. The power system can include, for example, a power source and a power regulator.

The cryptographic operation 112A-N includes various operations that utilize cryptography. Such operations may include, for example, executing a cryptographic hash function to generate a hash value for the data 204, verifying the cryptographic hash value that results, and ciphering (i.e., encrypting) the cryptographic hash value using a cypher key, and the like. In a payment transaction, for example, the payment data read by the card reader undergoes a series of processing steps before it gets transmitted to the merchant's device. In particular, before the payment data is transmitted to the merchant's device, it is processed in the encryption engine 110 to ensure that the payment data is secure. During the encryption process, one or more of the cryptographic operations 112A-N can take place, and protection from the DPA attacker 208 is needed during any one of these operations to ensure data security.

The I/O pins 116 include input pins and output pins. The pins may be any known or convenient form of contact of an integrated circuit that is utilized by the device to execute various functionalities, such as metal pins or wires, or solder balls of a ball grid array (BGA). The I/O pins 116 allow the device 102 to connect and communicate externally with any other device. Internally, the I/O pins 216 are connected, via a diode, to a power supply rail of the power system 120 to protect the embedded integrated circuit from static discharge. The power supply rail provides any power needed by the device 102 for various operations. The power supply rail may be part of the interconnect 114.

The I/O management controller 118 protects the device from the DPA attacker 108 by controlling the states of the I/O pins 116. Because of their internal connection to the power supply rail, the I/O pins 116 present a weakness that the DPA attacker 108 can manipulate. In particular, the DPA attacker 108 is able to detect, through the I/O pins 116, power leakage information during a cryptographic operation. The I/O management controller 118 provides a defense against such detection attempt. Whenever a particular cryptographic operation 112A is performed, the controller 118 sets all of the input pins of the I/O pins 116 to an "output state." Being in an output state functionally converts the input pins into output pins and disables their "input" functionality; consequently, no communication from the outside world is possible through these input pins. In effect, the device 102 is configured to prevent itself from communicating with its external environment to achieve greater security whenever it performs a cryptographic operation 112A. When the input pins are disabled, the DPA attacker 208 is not able to detect any power leakage information from the cryptographic operation.

The I/O management controller 118 restores all input pins of the I/O pins 116 to its normal operating state, i.e., "input state," whenever the cryptographic operation is complete. Accordingly, the device 102 regains its ability to communicate externally when it is no longer executing the cryptographic operation.

Figure 2:
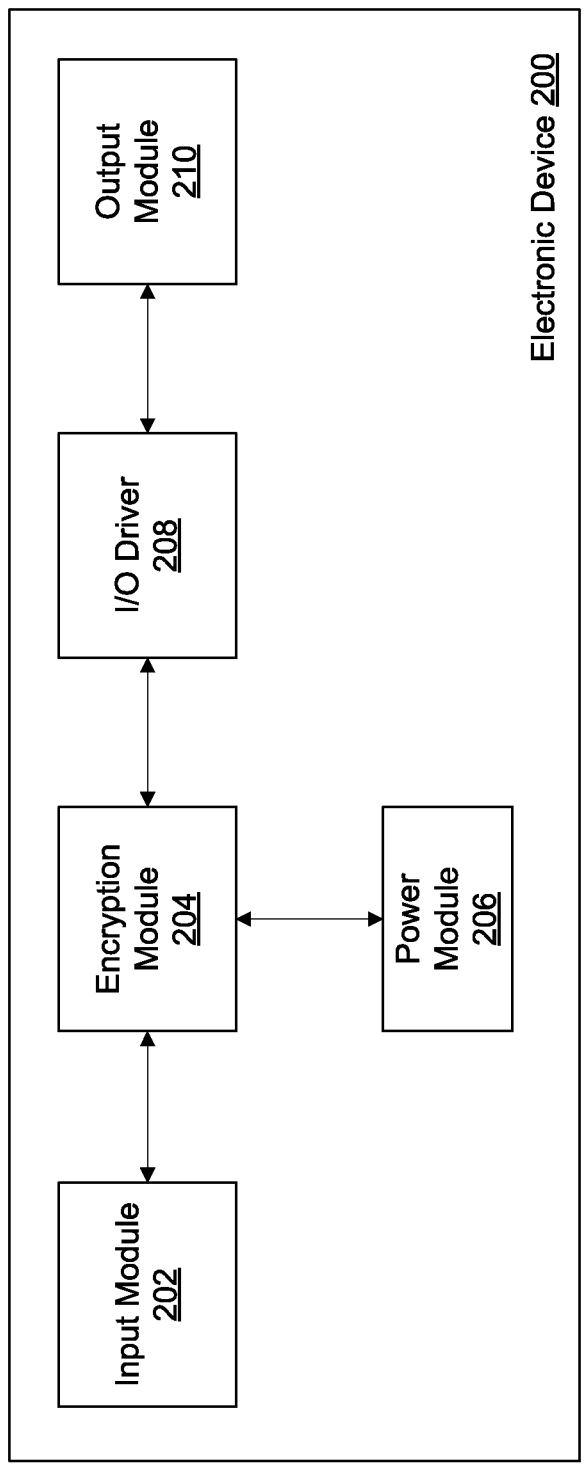
FIG. 2 illustrates a system diagram of an electronic device that implements blanking mode to counter DPA attacks.

FIG. 2 illustrates an example system diagram of an electronic device 200 with blanking mode to counter DPA attacks. The electronic device can be the device 102 of FIG. 1. As used herein, "blanking mode" refers to a mode of operation in which an electronic device is operating without any communications with the environment external to the device.

The electronic device 200 includes an input module 202, an encryption module 204, a power module 206, an input/output (I/O) driver 208, and an output module 210. The electronic device 200 is designed to be resistant to DPA attacks during sensitive operations, such as data security related operations. Such an operation is, for example, a cryptographic operation.

The input module 202 is configured to receive, read, or sense input data for the electronic device 200. The electronic device can be, for example, a card reader having an input device, such as a card slot to enable swiping of a payment card for use in a payment transaction. In such example, the input module is coupled to the card slot to read data from the card slot.

The encryption module 204 is configured to carry out various cryptographic operations on input data read by the input module. The power module 206 is configured to regulate and deliver the power needed by the encryption module. The I/O driver 208 is configured to manage terminals, or contacts, of the computing system of the electronic device 200, in coordination with the encryption module 204. Some of the terminals are designated as input terminals while others are designated as output terminals. The terminals can be the I/O pins 116 of FIG. 1. The terminals allow the device 200 to communicate with external devices. Such communication is controlled by the I/O driver 208 to protect the device 200 from DPA attacks during cryptographic operations directed by the encryption module 204.

The I/O driver 208 is configured to change the state of each of the terminals to either an "input state" or an "output state." The state of each terminal may be set and/or reset between a normal mode and a blanking mode. In normal mode, the input terminals are set to be in the input state and may be utilized to read or detect external signals. The output terminals, in the normal mode, are set to be in the output state and may be used to drive external devices. In the blanking mode, the I/O driver specifically sets the input terminals be in an output state. As a result, when in the blanking mode, all communications of the device 200 with external devices are disabled.

The I/O driver 208 configures the input terminals to be in the output state whenever the device 200 undergoes a sensitive operation mode. Such sensitive mode occurs when the encryption module performs a cryptographic operation, subjecting the device 200 to DPA attacks. Being in the output state disables the input terminals and prevents them from functioning. As a result, a DPA attacker will not be able to partially power the device via the input terminals in an attempt to monitor for differential power signals. Under the normal mode, the I/O pins 116 are restored to the output state, and all communications are enabled.

In some embodiments, the I/O driver 208 implements blanking mode as part of every execution of a cryptographic operation. For example, the encryption module 204 may include instructions to activate the blanking mode before executing the cryptographic operation. The module may include further instructions to disable the blanking mode after the cryptographic function is completed. In some embodiments, the I/O driver implements blanking mode separately from the cryptographic operation. For example, the I/O driver 208 awaits for a signal from the encryption engine before activating blanking mode.

Each of the blocks, components, and/or modules associated with the electronic device 200 may be implemented in the form of special-purpose circuitry, or in the form of one or more programmable processors that are programmed to provide the functionality described above, or in a combination of such forms. For example, the modules described can be implemented as instructions on a tangible storage memory capable of being executed by a processor or a controller on a machine. The tangible storage memory can be a volatile or a non-volatile memory. In some embodiments, the volatile memory can be considered "non-transitory" in the sense that it is not a transitory signal. Modules can be operable when executed by a processor or other computing device, e.g., a single board chip, application specific integrated circuit, a field programmable field array, a network capable computing device, a virtual machine terminal device, a cloud-based computing terminal device, or any combination thereof.

Each of the modules can operate individually and independently of the others. Some or all of the modules can be executed on the same host device or on separate devices. The separate devices can be coupled via a communication module to coordinate its operations via an interconnect or wirelessly. Some or all of the modules can be combined as one module.

A single module can also be divided into sub-modules, each sub-module performing separate method step or method steps of the single module. In some embodiments, the modules can share access to a memory space. One module can access data accessed by or transformed by another module. The modules can be considered "coupled" to one another if they share a physical connection or a virtual connection, directly or indirectly, allowing data accessed or modified from one module to be accessed in another module. In some embodiments, some or all of the modules can be upgraded or modified remotely. The electronic device 200 can include additional, fewer, or different modules for various applications.

Figure 3:
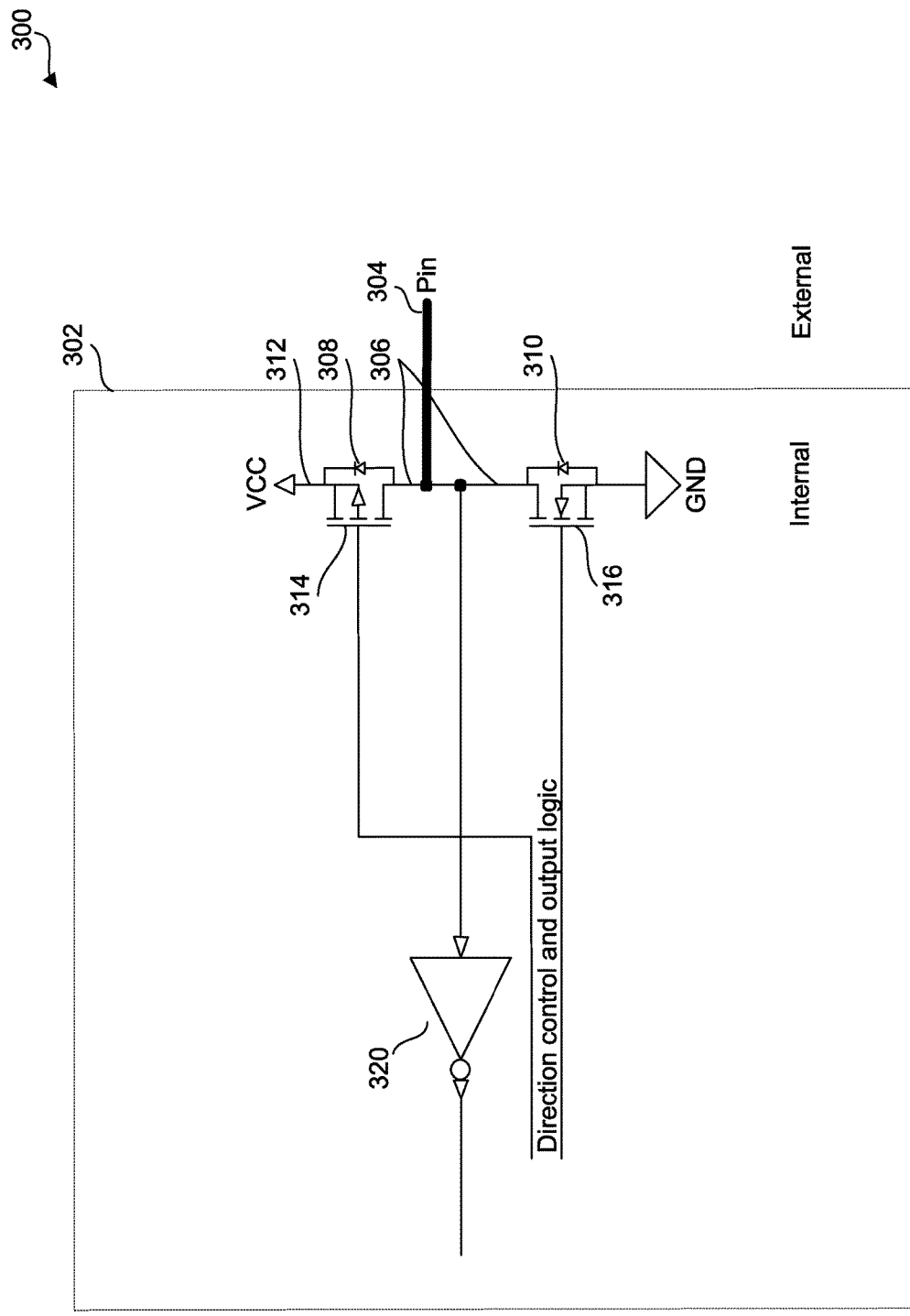
FIG. 3 illustrates an input/output (I/O) circuit associated with an I/O pin of a microcontroller in which the blanking technique may be implemented.

FIG. 3 illustrates an input/output (I/O) circuit 300 associated with an I/O pin 304 of a microcontroller 302 in which the blanking technique may be implemented, according to one embodiment. The microcontroller 302 may be, for example, any known or convenient single-chip solution embedded in a device to execute various operations, including cryptography. The microcontroller 302 includes the I/O pin 304, an input/output (I/O) connection line 306, diodes 308, 310, a power supply rail 312, MOSFETs 314, 316, and an inverter 320.

The I/O pin 304 is configured as an input pin and is connected to the rest of the components on the microcontroller 302 via an I/O connection line 306. Note that only one I/O pin is illustrated for the sake of simplicity; however, one of ordinary skill in the art will understand that the microcontroller 302 may actually have multiple I/O pins 304 (i.e., several to dozens of input pins and output pins). The pin 304 allows the device, in particular, the microcontroller 302, to communicate with an external environment and connect, for example, with an external device. Because of this external connection, however, the microcontroller 302 is subject to damage from static discharge via the pin 304. As such, diodes 308, 310 are placed, by traditional design, between the I/O connection line 306 and a power supply rail 312 to protect the microcontroller 302 from the static discharge damage. The power supply rail 312 is connected to a power system that powers the microcontroller 302.

A DPA attack on the traditional design of the microcontroller 302 can be implemented by providing via the pin 304 an amount of voltage slightly greater than the VCC of the power supply rail 312. As a result, the diode 308 will conduct and allow the pin to partially power the microcontroller 302. Micro power signals resulting from this partial powering can be monitored. Differential power analysis (DPA) is then implemented on the data collected from the monitoring. As a result, the "secrets" of the device are at risk even if a designer has taken care to put the power system behind a tamper barrier.

According to one embodiment, such DPA attack discussed above may be prevented by disabling all input pins, such as the pin 304, of the microcontroller 302 whenever a cryptographic operation is being performed. Disablement may be done by driving the pin 304 to a logic low; in particular, the MOSFET 316 is turned "On" and conducts to ground. The MOSFET 316 can be controlled to turn "On" or "Off" by the I/O driver 208 of FIG. 208 or the I/O pin state controller 118 of FIG. 1. When grounded, or "blanked," the state of the pin 304 is set to an "output state," and it becomes impossible for an attacker to raise the voltage via the pin 304 above the VCC level. As a result, the microcontroller 302 becomes "unplugged", or disengaged, from the external world because no electrical communication is possible. This disengagement is specifically activated whenever the microcontroller is performing a data security related operation. When an external device is unable to communicate with the device, it is unable to detect power dissipation through the pin 304 during the sensitive operation. As a result, no sensitive information is obtained from the device. When the sensitive operation is complete, the MOSFET 316 is turned "Off." As a result, the state of the pin 304 is reset to an "input state," and the microcontroller 302 is able to start communicating with the external environment again via the pin 304.

Figure 4:
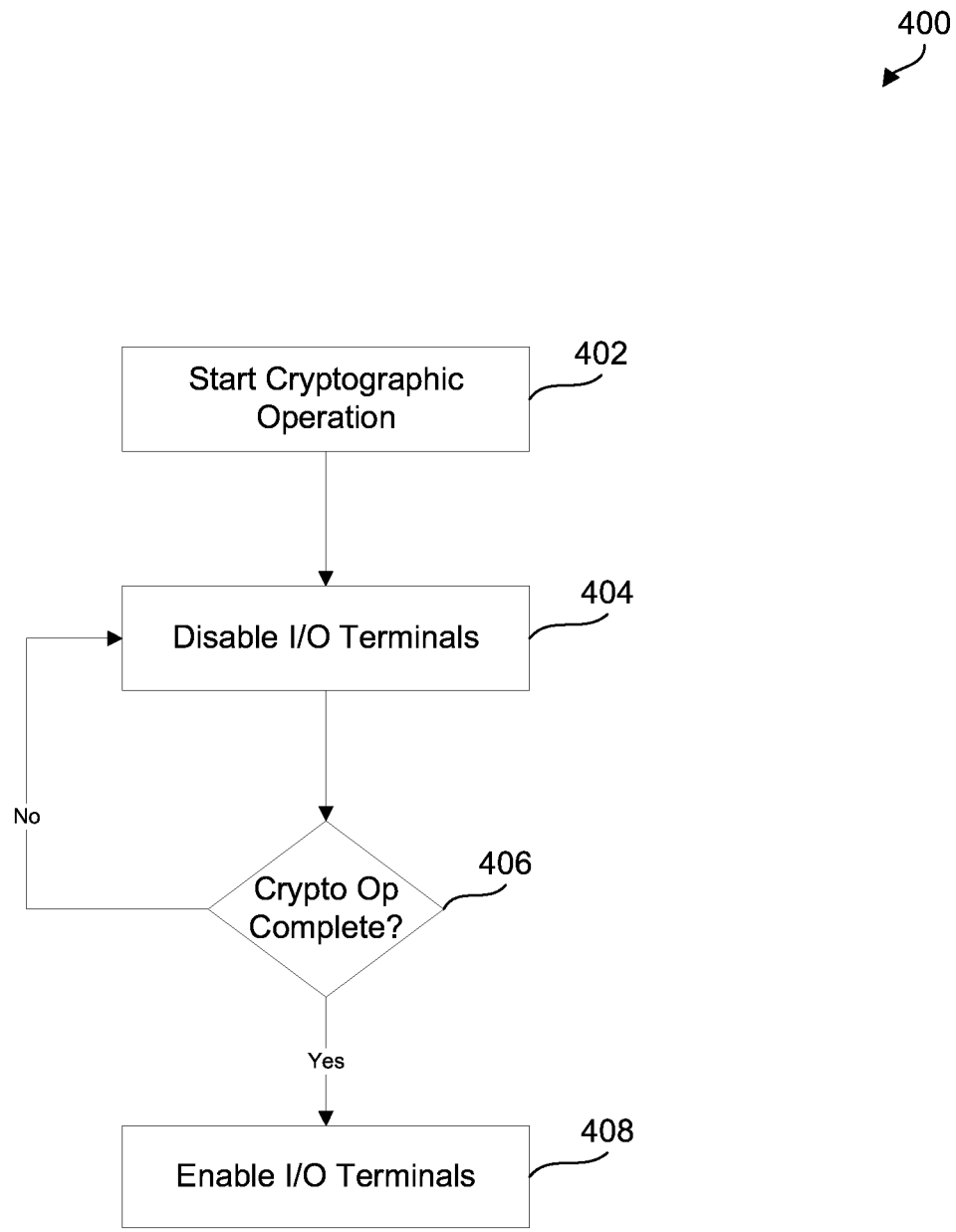
FIG. 4 illustrates an example of a process of protecting a device from DPA attacks during cryptographic operations.

FIG. 4 illustrates an example of a process 400 of protecting an electronic device from DPA attacks during cryptographic operations. At step 402, the electronic device initializes a cryptographic operation. As used herein, "initialization" of the cryptographic operation refers to a state in which the device is about to perform the operation, that the operation will be performed but the operation has yet to be executed. Step 402 can be performed by the encryption engine 110 of FIG. 1 or the encryption module 204 of FIG. 2. The step can be performed, for example, by executing instructions or routines stored in a memory of the encryption engine 110 or the encryption module 204.

In some embodiments, step 402 can include receiving, by the device, a signal indicative of an initialization of a cryptographic operation. Upon receiving such signal, the device enters blanking mode to disable all terminals, such that no communication with the external environment is allowed. The device exits blanking mode when it receives a second signal indicative of the cryptographic operation being complete. In some embodiments, the signal may be provided by the encryption engine 110 of FIG. 1 or the encryption module 204 of FIG. 2. In some embodiments, the signal may be provided by the I/O pin state controller 118 of FIG. 1 or the I/O driver 208 of FIG. 2. In some embodiments, the signal may be provided by the power system 120 of FIG. 1 or the power module 206 of FIG. 2. In some embodiments, the signal may be provided by the encryption engine 110 (or the module 204), the controller 118 (or driver 208), and the power system (or module 206) working in conjunction.

At step 404, the device activates blanking mode just prior to execution of the cryptographic operation to disable all input terminals of the device. The input terminals can be the pins 116 of FIG. 1 or the pin 304 of FIG. 3. During blanking mode, the input terminals are set to a logic low, and no electrical signals can be transmitted into the device via the terminals. Once blanking mode is activated, the device proceeds to execute the cryptographic operation. Being in blanking mode while the cryptographic operation is being performed allows the device to be more resistant to DPA attacks. The blanking mode executed in step 404 can be performed by the I/O pin state controller 118 of FIG. 1 or the I/O driver 208 of FIG. 2.

At decision block 406, the device determines whether the cryptographic operation is complete. If the cryptographic operation is still not complete, the input terminals remain disengaged, as indicated in step 404. If the cryptographic is complete, the input terminals are re-enabled, as indicated in step 408. In some embodiments, steps 406-408 are performed by the I/O pin state controller 118 of FIG. 1 or the I/O driver 208 of FIG. 2. In some embodiments, steps 406-408 are performed by the controller 118 (or the driver 208) and the encryption engine 110 (or the encryption module 204) working in conjunction.

In some embodiments, the process 400 can be implemented in coordination with a sensitive operation other than the cryptographic operation, where the device enters blanking mode until the sensitive operation is complete.

Figure 5:
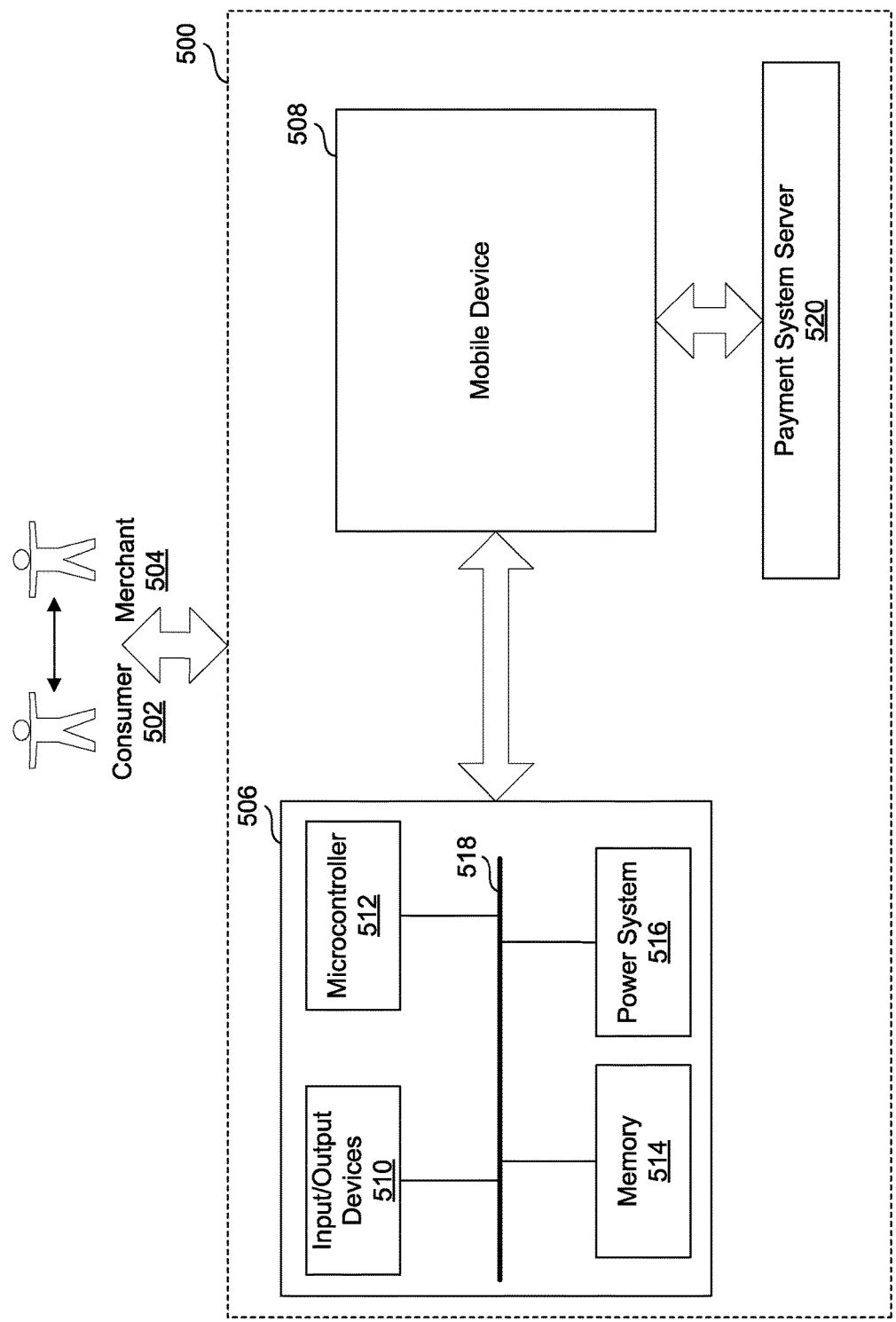
FIG. 5 is a block diagram of a payment processing system in which a blanking mode protection can be implemented.

FIG. 5 is a block diagram of a payment processing system 500 that implements the blanking technique described above to protect a financial transaction between a consumer 502 and a merchant 504 from DPA attacks. The system 500 includes a device 506, a mobile device 508, and a payment system server 520.

The payment device 506 may be any electronic device capable of reading data from a payment card (e.g., a traditional credit/debit card or an integrated circuit-containing "smartcard"), of encrypting the data, and of transmitting the secured data to another device, such as the mobile device 508. The payment device 506 may include one or more input/output (I/O) devices 510, a microcontroller 512, a memory 514, and a power system 516, all of which are coupled to one another via an interconnect 518. The interconnect 518 may include one or more buses, direct connections and/or other types of physical connections, such as are well-known in the art.

The I/O devices 510 may include one or more devices such as: a pointing device such as a mouse, a touchpad, or the like; a keyboard; a microphone; audio speakers; a display device; etc. An I/O device 510 can be, for example, a card slot for receiving input payment data through a swipe of the consumer's payment card through the card slot. The microcontroller 512 may be any small computing device on a single integrated circuit containing a processor core, memory, and programmable I/O terminals that can be configured to communicate with the input/output devices 510 and allow the device 506 to communicate with other external devices. The microcontroller 512 may be utilized by the payment device 506 to execute embedded applications necessary for the financial transaction between the consumer 502 and the merchant 504. The power system 516 supplies the necessary power to the microcontroller 512 to implement various operations associated with the embedded applications.

The various operations of the microcontroller 512 may include, for example, one or more cryptographic operations that are performed to secure the payment data. The microcontroller can manage the I/O terminals in conjunction with the cryptographic operations in order to provide greater security during the operations. In particular, the microcontroller disables the electrical communication via the input terminals (i.e., enters blanking mode) when the microcontroller is performing a data security related operation, such as a cryptographic operation; the communication is enabled when the data security related operation is complete. When the communication is enabled, the device 506 is able to communicate with external devices, such as being able to transmit the encrypted payment data to the mobile device 508. Management of the I/O terminals can be performed by the I/O pin state controller 118 of FIG. 1 or the I/O driver 208 of FIG. 2. In some embodiments, the controller 118 or the I/O driver 208 is a part of the microcontroller 512. In some embodiments, the controller 118 or the I/O driver 208 is executed on the microcontroller 512.

The mobile device 508 may be a smartphone (e.g., iPhone®, an Android® enabled device, etc.), a tablet computer (e.g., iPad®, Samsung Galaxy Tab®, etc.) The payment system server 520 connects the device 508 to the financial account associated with the payment card, and enables completion of the financial transaction (e.g., account verification, payment processing, etc.).

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., a field programmable gate array (FPGA) or an application-specific integrated circuit (ASIC).

The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

What is claimed is:

1. A method of managing pin states in a card reader, comprising:
   in the card reader, detecting initialization of a cryptographic operation for processing payment data received, by the card reader, from a payment card to facilitate a payment transaction;
   applying a blanking mode to prevent reception of communications from any device external to the card reader during the cryptographic operation by setting an input/output (I/O) terminal of the card reader to an output operating state; and
   deactivating the blanking mode by restoring the I/O terminal of the card reader to an input operating state in response to a completion of the cryptographic operation, the deactivating enabling the card reader to transmit the payment data to a merchant device to complete the payment transaction.

2. The method of claim 1, wherein setting the terminal of the card reader to the output operating state comprises:
   changing a logic state of the input/output (I/O) terminal of the card reader to a predetermined logic level to disable communication through the I/O terminal.

3. The method of claim 1, wherein restoring the terminal of the card reader to the input operating state comprises:
   restoring a prior logic state of the I/O terminal of the card reader to restore an ability to communicate through the I/O terminal.

4. The method of claim 1, wherein the cryptographic operation comprises at least one of:
   generating a cryptographic hash from the payment data;
   verifying the cryptographic hash associated with the payment data; or
   encrypting the cryptographic hash associated with the payment data.

5. An apparatus comprising:
   a plurality of input/output (I/O) terminals for communicating with a device that is external to the apparatus;
   a processor, coupled to the I/O terminals to receive input data, and configured to perform a data security operation on the received input data; and
   an I/O controller, coupled to the processor to receive a signal indicative of the data security operation, and configured to respond to the signal by setting a state of the plurality of I/O terminals to an output operating state so as to prevent reception of communications from an environment external to the apparatus through the plurality of I/O terminals.

6. The apparatus of claim 5, wherein the I/O controller sets the state of the plurality of I/O terminals to a predetermined logic level in response to the signal being asserted to indicate that the data security operation has been initialized.

7. The apparatus of claim 5, wherein the I/O controller sets the state to a normal input operating state in response to the signal being de-asserted to indicate the data security operation is complete.

8. The apparatus of claim 5, wherein the data security operation comprises a cryptographic operation.

9. The apparatus of claim 8, wherein the cryptographic operation comprises at least one of:
   generating a cryptographic hash;
   verifying a cryptographic hash; or
   encrypting a cryptographic hash.

10. A method comprising:
    receiving a signal indicative that a data security operation is about to be performed within an electronic device;
    in response to receiving the signal,
       setting a terminal of the electronic device to an output operating state to prevent reception of communications from an environment external to the electronic device through the terminal; and
    in response to completion of the data security operation, restoring the terminal of the electronic device to an input operating state.

11. The method of claim 10, wherein setting the terminal of the electronic device to the output operating state includes setting the terminal to a logic low state in response to the signal being asserted to indicate the data security operation has been initialized.

12. The method of claim 10, wherein the terminal is set to the input operating state in response to the signal being negative to indicate the data security operation is complete, the input operating state restoring an ability to communicate with the environment external to the electronic device through the terminal.

13. The method of claim 11, wherein the terminal is an input terminal and wherein the logic low state results in the input terminal being turned into an output terminal.

14. The method of claim 10, wherein the terminal comprises a solder ball of a ball grid array.

15. The method of claim 10, wherein the data security operation comprises a cryptographic operation.

16. The method of claim 15, wherein the cryptographic operation comprises at least one of:
    generating a cryptographic hash;
    verifying a cryptographic hash; or
    encrypting a cryptographic hash.

17. A computer-readable medium storing instructions for execution by a processor of a device to perform a method of managing an input/output (I/O) pin of the device, comprising:
    instructions for receiving a request to perform a cryptographic operation at the device;
    instructions for disabling communication with an external environment through the I/O pin during the cryptographic operation by setting the I/O pin to an output operating state in response to receiving the request; and
    instructions for enabling communication with the external environment through the I/O pin after completion of the cryptographic operation by restoring the I/O in to an input operating state.

18. The computer-readable medium of claim 17, wherein the instructions for disabling communication comprise instructions for driving the I/O pin to a logic low to prevent the device from receiving or transmitting any signal from or to the external environment.

19. The computer-readable medium of claim 17, wherein the cryptographic operation comprises at least one of:
   generating a cryptographic hash;
   verifying a cryptographic hash; or
   encrypting a cryptographic hash.

\* \* \* \* \*